United States Patent
Shona et al.

[11] Patent Number: 6,018,581
[45] Date of Patent: Jan. 25, 2000

[54] COMMUNICATION SYSTEM AND COMMUNICATION METHOD

[75] Inventors: Yoshihiro Shona; Kazuya Kawano; Masaharu Kizaki, all of Tokyo, Japan

[73] Assignees: Oki Electric Industry Co., Ltd.; Casio Computer, Co., Ltd., both of Tokyo, Japan

[21] Appl. No.: 08/808,542

[22] Filed: Feb. 28, 1997

[30] Foreign Application Priority Data

Feb. 29, 1996 [JP] Japan ..................... 8-043315

[51] Int. Cl.[7] ...................................................... H04L 9/00
[52] U.S. Cl. ............................................... 380/46; 380/49
[58] Field of Search .................................. 380/30, 46, 49

[56] References Cited

U.S. PATENT DOCUMENTS

| | | | |
|---|---|---|---|
| 4,218,582 | 8/1980 | Hellman et al. | 380/30 |
| 4,238,854 | 12/1980 | Ehrsam et al. | |
| 5,046,094 | 9/1991 | Kawamura et al. | 380/46 |
| 5,596,641 | 1/1997 | Ohashi et al. | 380/46 |
| 5,600,720 | 2/1997 | Iwamura et al. | 380/46 |
| 5,787,179 | 7/1998 | Ogawa et al. | 380/46 |
| 5,799,085 | 8/1998 | Shona | 380/46 |

*Primary Examiner*—Salvatore Cangialosi
*Attorney, Agent, or Firm*—Wenderoth, Lind & Ponack, L.L.P.

[57] ABSTRACT

A communication system can maintain high security in communication between a communication apparatus and a terminal. The communication system includes the communication apparatus and the terminal provided with a memory unit for storing data for specifying function of the communication apparatus. The communication apparatus and the terminal include random number generators for generating random numbers, encryption/decryption key preparing units for preparing encryption/decryption keys on the basis of both random numbers and generated by the respective random number generators of the communication apparatus and the terminal and a secret key held in common by the communication apparatus and the terminal, and encryption/decryption processing units for encrypting or decrypting communication data between the communication apparatus and the terminal containing the data by means of the encryption/description key, respectively.

18 Claims, 6 Drawing Sheets

COMMUNICATION SYSTEM AND COMMUNICATION METHOD

BACKGROUND OF THE INVENTION

The present invention relates to a communication system including, for example, a communication apparatus and various terminals represented by, for example, IC cards used in combination with the communication apparatus to specify the function of the communication apparatus, and a communication method.

There is proposed an attempt that a receiving apparatus capable of receiving a number of TV programs or radio programs is manufactured as a communication apparatus, and the receiving apparatus and an IC card for placing restrictions on the receiving apparatus in accordance with contents of a contract, are sold as a set.

Stored in the IC card are data defined in accordance with the contents of the contract which enable the receiving apparatus to receive only a specific program or to receive programs only during a predetermined term of the contract, for example.

Accordingly, when the IC card constituting a terminal is connected or loaded into the receiving apparatus combined with the IC card as the set, communication between the receiving apparatus and the IC card is performed. The receiving apparatus reads out the data for specifying the contract contents from the IC card by means of the communication, so that a predetermined function is selectively given to the receiving apparatus on the basis of the data.

In the communication between the receiving apparatus and the IC card, in order to prevent the inequity by forgery, the authentication for judging whether both of them have a genuine relation with each other based on the regular contract or not is performed and, after the authentication, transmission and reception of data for specifying the contract contents is made therebetween.

FIG. 6 is a schematic diagram illustrating an example of a communication method in a communication system including an IC card and a receiving apparatus in a prior art.

As shown in FIG. 6, the conventional communication system adopts the mutual authentication.

An IC card 1 and a receiving apparatus 2 include random number generators 3 and 4, respectively. The receiving apparatus 2 transmits a random number R1 generated by the random number generator 4 to an authentication code preparing unit 5a of the IC card 1 and prepares, at an authentication code preparing unit 6a thereof, an authentication code X' on the basis of a first secret key X1 held in common by the IC card 1 and the receiving apparatus 2 and the random number R1. The IC card 1 which has received the random number R1 prepares, at the authentication code preparing unit 5a thereof, an authentication code X on the basis of the first secret key X1 and the random number R1 and sends the authentication code X to the receiving apparatus 2.

The receiving apparatus 2 which has received the authentication code X from the IC card 1 compares, at a comparison unit 8 thereof, the authentication code X with the authentication code X' prepared by the authentication code preparing unit 6a to thereby perform a first authentication A.

Further, the IC card 1 transmits a random number R2 prepared by a random number generator 3 thereof to an authentication code preparing unit 6b of the receiving apparatus 2 and prepares, at an authentication code preparing unit 5b thereof, an authentication code Y on the basis of a second secret key X2 held in common by the IC card 1 and the receiving apparatus 2, and the random number R2. The receiving apparatus 2 which has received the random number R2 prepares at the authentication code preparing unit 6b an authentication code Y' on the basis of the second secret key X2 and the random number R2, and transmits the authentication code Y' to the IC card 1.

The IC card 1 which has received the authentication code Y' from the receiving apparatus 2 compares at its comparison unit 7 the authentication code Y with the authentication code Y' prepared by the unit 6b of the receiving apparatus 2 to thereby perform a second authentication B.

After it has been confirmed that both of them have genuine relation with each other based on the regular contract in accordance with the mutual authentication A and B, data specifying the contract contents are exchanged therebetween in plain text.

In the conventional system as described above, the secret keys X1 and X2 used in the first and second authentication A and B can be made identical, while different keys are used as the secret keys X1 and X2, respectively, so that cryptanalysis of the secret keys is made difficult.

In the conventional system, however, since the data specifying the contract contents are exchanged in plain text, the plain text data can be deciphered or understood relatively easily by monitoring the plain text data with technical knowledge of a certain degree.

Even if the plain text data are deciphered, alteration such as, for example, extension of a contract term, addition of contract, or the like is made to the IC card 1 or the receiving apparatus 2 is directly modified on the basis of the deciphered plain text data relatively easily.

Further, in the conventional system, the authentication codes X and Y' are prepared on the basis of the single random number R1 or R2 and the single secret key X1 or X2, respectively. Accordingly, it is relatively easy to cryptanalyze the secret key X1 or X2 by monitoring the communication between the communication apparatus and the terminal. The cryptanalysis of the secret key increases the possibility that the terminal, such as the IC card, is forged.

SUMMARY OF THE INVENTION

Accordingly, it is an object of the present invention to provide a communication system and method capable of maintaining the higher security than in the prior art even if communication between a communication apparatus and a terminal is monitored.

Further, it is another object of the present invention to provide a communication system and method which make alteration or forgery difficult as compared with the prior art.

The communication system according to the present invention including a communication apparatus for reception or transmission and a terminal provided with a memory unit in which data for specifying function of the communication apparatus are stored, is characterized in that the communication apparatus and the terminal each comprise a random number generating unit for generating a random number, an encryption/decryption key preparing unit for preparing an encryption/decryption key on the basis of both random numbers generated by the respective random number generating units of the communication apparatus and the terminal and a secret key held in common by the communication apparatus and the terminal, and an encryption/decryption processing unit for encrypting or decrypting communication data between the communication apparatus and the terminal including the data by using the encryption/decryption key.

In the communication system according to, the present invention, the respective encryption/decryption key preparing units provided in the communication apparatus and the terminal prepare the encryption/decryption keys on the basis of both the first and second random numbers and the secret key. Further, the communication apparatus and the terminal encrypt at the respective encryption/decryption processing units communication data between the communication apparatus and the terminal on the basis of the encryption/decryption keys prepared on the basis of both the random numbers and the secret key, so that communication between the communication apparatus and the terminal is performed by means of the ciphertext.

Accordingly, plain text is not used in communication between the communication apparatus and the terminal as in the prior art and even if communication between the communication apparatus and the terminal is monitored, it is not easy to cryptanalyze data or the like for specifying contact contents of the communication apparatus.

Furthermore, since the data or the like for specifying the contract contents are encrypted by means of the first and second random numbers of two kinds and the secret key, it is extremely complicated and difficult to cryptanalyze ciphertext as compared with cryptanalysis of a conventional authentication code which is encrypted by a single random number and a secret key and does not include plain text data information.

Consequently, the encrypted communication contents are not cryptanalyzed by a relatively easy cryptanalysis as in the prior art.

Accordingly, it is not easy even for the user based on the regular contact to cryptanalyze communication contents between the terminal used by the user itself and the communication apparatus and alteration of the terminal and the communication apparatus based on cryptanalysis of the communication contents is prevented exactly.

The terminal may include a reading/writing unit for reading data from the memory unit and writing data into the memory unit. The reading/writing unit may include judgment means for controlling reading of data from and writing of data into the memory unit. Further, the encryption/decryption key preparing means provided in the terminal may include signal producing means for producing a first signal for permitting reading of data by the reading/writing unit and a second signal for permitting writing of data by the reading/writing unit to supply the signals to the judgment means.

The data for specifying the function of the communication apparatus may include data for specifying a receivable program of the communication apparatus by way of example.

Further, the data for specifying the function of the communication apparatus may include, as another example, data of a term for the receivable program specified by the communication apparatus.

The signal producing means sends to the judgment unit a signal for permitting reading or writing.

The signal producing means can produce first and second flags as the signal to the judgment unit. The reading/writing unit is permitted to read data from the memory unit in a set state of the first flag and to write data into the memory unit in a set state of the second flag.

The random generating unit provided in the terminal may include an arithmetic operation unit for generating the second random number by using the first random number generated by the random number generating unit provided in the communication apparatus and a portion for storing the random number rewritably.

The arithmetic operation unit may be constituted by an arithmetic circuit for generating the second random number by the arithmetic operation of the random number stored in the random number storage portion and the first random number.

Further, the arithmetic operation unit may include a conversion processing circuit for converting the second random number.

The random number in the random number storage portion can be successively updated by a value converted by the conversion processing circuit.

Furthermore, the conversion of the conversion processing circuit can adopt a bit replacement process or a bit inversion process.

The communication method according to the present invention between a communication apparatus for reception or transmission and a terminal provided with a memory unit in which data for specifying function of the communication apparatus are stored, is characterized in that first and second random numbers generated by the communication apparatus and the terminal, respectively, and a secret key held in common by the communication apparatus and the terminal are used to encrypt the data and the function of the communication apparatus is restricted by communication of the encrypted data.

The communication apparatus and the terminal each comprise a random number generating unit, an encryption/decryption key preparing unit for preparing an encryption/decryption key on the basis of the first and second random numbers generated by the respective random number generating units and the secret key, and an encryption/decryption processing unit for encrypting or decrypting communication data between the communication apparatus and the terminal including the data by using the encryption/decryption key, and when the terminal receives a command from the communication apparatus for reading out data from the memory unit, the terminal encrypts the read-out data from the memory unit by means of the encryption/decryption key to transmit the encrypted data to the communication apparatus, the terminal being responsive to a command from the communication apparatus for writing data into the memory unit to decrypt ciphertext corresponding to the data by means of the encryption/decryption key and to write the decrypted data into the memory unit when the terminal receives the command from the communication apparatus.

The reading of data from the terminal and the writing of data to the terminal cannot be performed at the same time. By preventing the writing of data from being performed at the same time as the reading of data, alteration of data to the terminal can be prevented exactly.

DESCRIPTION OF THE PREFERRED EMBODIMENTS

The features which are considered characteristic of the invention will be more apparent from the following description taken in connection with embodiments shown in the accompanying drawings.

Figure 1:
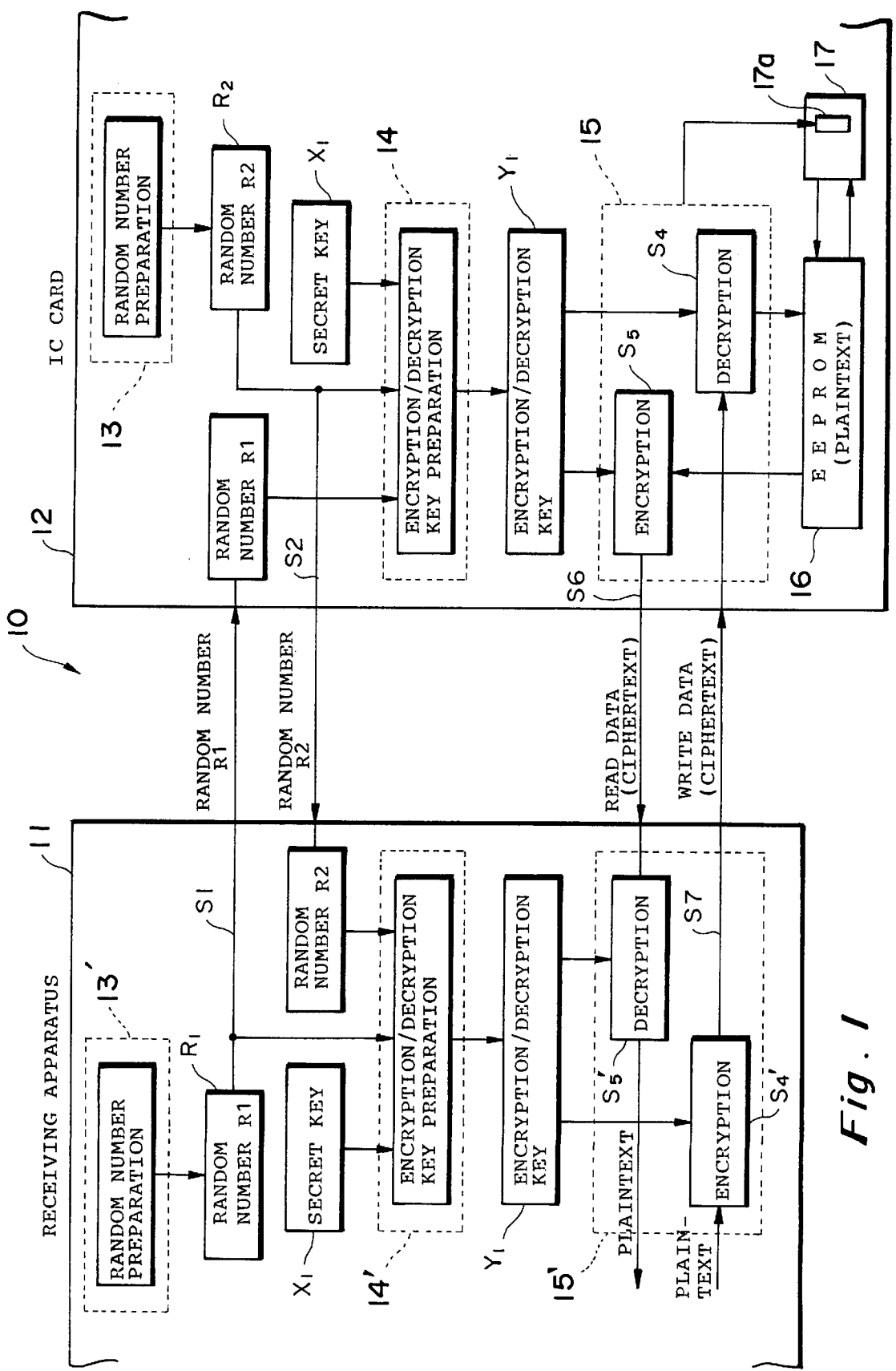
FIG. 1 is a schematic diagram illustrating a communication system according to the present invention.

A communication system 10 according to the present invention illustrated in FIG. 1 as an example comprises a receiving apparatus 11 such as, for example, a television receiver and a terminal 12 in which data for specifying the function of the receiving apparatus are stored. In the following description, an IC card 12 is used as the terminal 12 by way of example.

The communication system 10 according to the present invention comprises the receiving apparatus 11 and the IC card 12 for storing data relative to, for example, a receiving channel or a receiving term of the receiving apparatus 11.

The receiving apparatus 11 includes a random number generator 13' for generating a random number R1, an encryption/decryption key preparing unit 14' for preparing an encryption/decryption key on the basis of a secret key X1 held in common by the receiving apparatus 11 and the IC card 12, and an encryption/decryption processing unit 15' for encrypting plain text or decrypting cryptogram or ciphertext by using the encryption/decryption key Y1 prepared by the encryption/decryption key preparing unit 14'.

The IC card 12 combined with the receiving apparatus 11 includes a random number generator 13 for generating a random number R2, an encryption/decryption key preparing unit 14 for preparing an encryption/decryption key on the basis of the secret key X1, and an encryption/decryption processing unit 15 for encrypting plain text or decrypting ciphertext by using the encryption/decryption key Y1 prepared by the encryption/decryption key preparing unit 14.

Further, the IC card 12 includes a memory unit 16 made of a rewritable memory such as, for example, an EEPROM (Electrically Erasable Programmable Read Only Memory) for storing programs or data and a reading/writing unit 17 for writing data into the memory unit and reading data from the memory unit.

The encryption/decryption key preparing units 14' and 14 of the receiving apparatus 11 and the IC card 12, respectively, prepare the encryption/decryption key on the basis of the respective secret key X1 by using the random numbers R1 and R2 generated by the respective random number generator 13' and 13 and the random numbers R2 and R1 received from the other unit by means of communication between the receiving apparatus 11 and the IC card 12, respectively.

Further, the encryption/decryption processing units 15' and 15 of the receiving apparatus 11 and the IC card 12, respectively, encrypt plain text or decrypt ciphertext by using the encryption/decryption key Y1 prepared by the respective encryption/decryption key preparing unit 14' and 14, respectively.

Operation of each unit of the communication system 10 is now described.

Before communication of cryptogram between the receiving apparatus 11 and the IC card 12, the first random number R1 generated by the random number generator 13' of the receiving apparatus 11 is sent to the IC card 12 (step S1). On the other hand, the second random number R2 generated by the random number generator 13 of the IC card 12 is sent to the receiving apparatus 11 (step S2). Consequently, the receiving apparatus 11 and the IC card 12 hold both of the first and second random numbers R1 and R2.

The encryption/decryption key preparing units 14' and 14 prepare the encryption/decryption key Y1 on the basis of the secret key X1 held in common by both of the receiving apparatus 11 and the IC card 12 by using both of the first and second random numbers R1 and R2 (steps S3 and S3').

The encryption/decryption processing units 15' and 15 of the receiving apparatus 11 and the IC card 12, respectively, perform encryption and decryption by using the encryption/decryption key Y1 (steps S4, S4' and S5, S5').

The encryption/decryption key preparing units 14' and 14 can be constituted by, for example, an XOR circuit which attains an exclusive OR of both the first and second random numbers R1 and R2 and the secret key X1. It is desirable that even if each of the random numbers R1 and R2 is varied slightly the encryption/decryption key Y1 prepared by the encryption/decryption key preparing units 14' and 14 is varied greatly.

More particularly, when one bit or so of a series of bits representative of the random number R1 or R2 to be inputted is varied, it is desirable to use the encryption/decryption key preparing unit 14' or 14 which prepares the encryption/decryption key Y1 which is an output corresponding to the inputted random number and constituted by a series of bits having, for example, four to five bits of which values are varied.

The subsequent procedure is varies depending on programs or applications in the IC card 12 for specifying the function of the receiving apparatus 11.

Among these applications, an application which allows the receiving apparatus 11 to receive a specific receiving channel on the basis of a contract by means of the IC card 12 is now described.

When the IC card 12 is loaded into the receiving apparatus 11, the reading/writing unit 17 of the IC card 12 reads out data relative to the receivable channel stored in the memory unit 16 in plain text on the basis of a reading command from the receiving apparatus 11 to supply the data to the encryption/decryption processing unit 15. The encryption/decryption processing unit 15 encrypts the read plain text data by using the encryption/decryption key Y1 (step S5). Then, the encrypted data or the read data are sent to the receiving apparatus 11 (step S6).

The read data received by the receiving apparatus 11 are decrypted at the encryption/decryption processing unit 15' of the receiving apparatus 11 by using the encryption/decryption key Y1 (step S5').

On the basis of the plain text data decrypted by the above decryption, restrictions are placed on functions of the receiving apparatus 11 so that the receiving apparatus 11 can receive only a predetermined channel specified by the data and the receiving apparatus 11 exhibits only predetermined functions.

Further, when the receiving apparatus 11 receives a command of writing data to the IC card 12, the receiving apparatus 11 encrypts plain text of the write data at the encryption/decryption processing unit 15' by using the encryption/decryption key Y1 (step S4'). The encrypted write data is sent to the IC card 12 (step S7).

The write data received by the IC card 12 is decrypted at the encryption/decryption processing unit 15 by using the encryption/decryption key Y1. The decrypted plain text data is written in the memory unit 16 by the reading/writing unit 17.

The reading of data from the memory unit 16 and the writing of data to the memory unit 16 of the IC card 12 can be executed by the reading/writing unit 17 only when the processes at the above steps S1 to S3 have been completed normally.

Judgment as to whether the processes of the steps S1 to S3 have been completed normally or not can be made by judgment means 17a using, for example, one or a plurality of flags as described later.

In communication between the receiving apparatus 11 and the IC card 12, data are not exchanged in plain text, and ciphertext is used to exchange data. Furthermore, since two kinds of the first and second random numbers are used to prepare the ciphertext, data cannot be cryptanalyzed easily as in the prior art even if cryptanalysis by monitoring of communication between the receiving apparatus 11 and the IC card 12 is tried.

Accordingly, the security of the communication system 10 is enhanced as compared with the prior art.

More particularly, the encryption/decryption key Y1 is varied in accordance with the random numbers R1 and R2 each time data is read and written. Accordingly, even if a number of read data or write data as described above are monitored and the encrypted communication information obtained by the monitoring and operation thereof are analyzed, it is substantially impossible to analyze commands, even if the commands are plain text data, or the data itself.

Further, even if the commands of plain text data or the data itself are not analyzed, there remains the possibility that contents of the communication information can be analyzed by the analysis of encrypted specific communication information and operation thereof. However, as described above, since the analyzed communication information includes a parameter of the encryption/decryption key Y1 varied each time data is read and written, it is extremely difficult to decrypt the communication information in order to understand the plain text data corresponding to the communication information.

Furthermore, even if the contents of the communication information including the parameter of the encryption/decryption key Y1 are analyzed and the communication information obtained with the intention of rewriting data in the memory unit 16 is inputted to the encryption/decryption processing unit 15 of the IC card 12, it is substantially impossible to rewrite data to intended contents since the encryption/decryption key Y1 upon analysis is different from the encryption/decryption key Y1 upon writing.

Accordingly, the security of communication between the receiving apparatus 11 and the IC card 12 can be enhanced and furthermore alteration or forgery by rewriting of data in the IC card 12 can be prevented exactly.

As described above, in the communication system 10, the encryption/decryption key Y1 is prepared from the two random numbers R1 and R2 and the secret key X1 and data encrypted by using the encryption/decryption key Y1 are exchanged between the receiving apparatus 11 and the IC card 12.

Accordingly, even when data having the same contents are read/written, values of the random numbers R1 and R2 used upon execution thereof are varied and a value of the encryption/decryption key Y1 is varied in accordance with the variation of the random numbers.

Accordingly, as described above, even if communication between the receiving apparatus 11 and the IC card 12 is monitored, cryptanalysis of ciphertext is not easy and high security can be ensured.

Further, even if contents of the communication information including the parameter of the encryption/decryption key Y1 are analyzed, since a value of the encryption/decryption key Y1 is varied each time data is read/written, alteration or forgery by rewriting of data in the IC card 12 can be prevented exactly and further alteration or forgery that the receiving apparatus 11 does not require the IC card 12 can be also prevented exactly.

Figure 2:
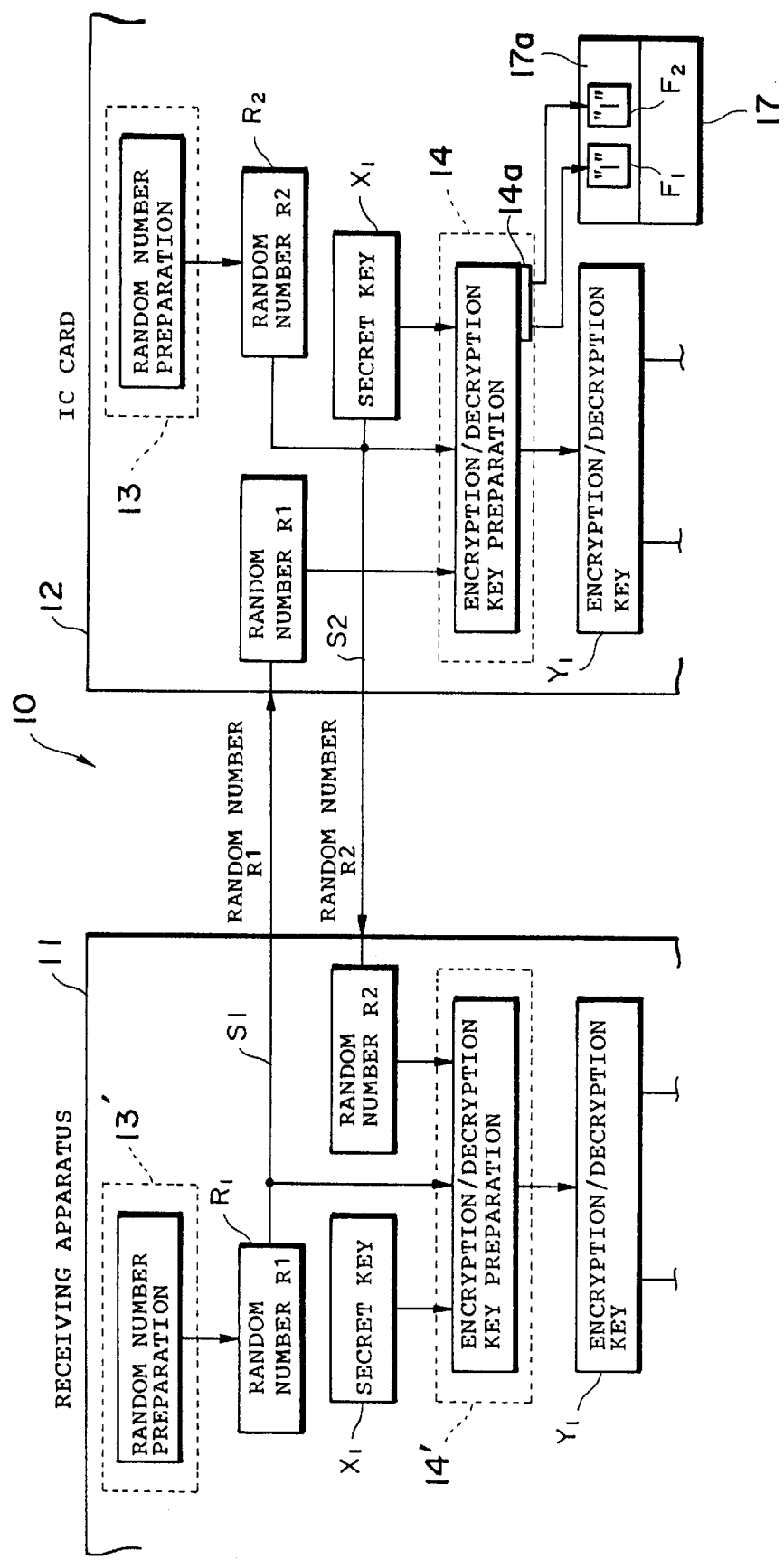
FIG. 2 is a schematic diagram similar to FIG. 1 illustrating another communication system according to the present invention.

The communication system 10 shown in FIG. 2 is basically identical with the communication system 10 shown in FIG. 1. In the communication system of FIG. 2, reading of data from and writing of data into the memory unit 16 of the IC card 12 is controlled by two flags from the encryption/decryption key preparing unit 14 of the IC card 12.

In FIG. 2, the encryption/decryption processing units 15' and 15, the memory unit 16 and the like are omitted for simplification of the drawing.

The encryption/decryption key preparing unit 14 of the IC card 12 includes signal producing means 14a for producing a first flag signal F1 which is a first signal and a second flag signal F2 which is a second signal.

Upon turning on of a power supply of the IC card 12 and upon resetting of the IC card 12, both the signals from the signal producing means 14a are set to a non-output state or a reset state "0", representing that reading and writing of data are not permitted.

When the encryption/decryption key preparing unit 14 of the IC card 12 prepares the encryption/decryption key Y1, the signal producing means 14a sets both the first and second flag signals F1 and F2 to "1" representing that reading or writing of data is permitted.

The reading/writing unit 17 of the IC card 12 includes judgment means 17a which receives the flag signals F1 and F2.

When the reading/writing unit 17 receives an instruction for a data reading process for reading data from the memory unit 16 (FIG. 1), the reading/writing unit 17 changes the second flag F2 to the reset state "0" if the first flag F1 is in the set state "1". Further, when the reading/writing unit 17 receives an instruction for a data writing process for writing data into the memory unit 16, the reading/writing unit 17 changes the first flag F1 to the reset state "0" if the second flag F2 is in the set state "1".

The operating of reading data from and writing data into the memory unit 16 of the IC card 12 is now described with reference to FIGS. 3 and 4.

When the encryption/decryption key Y1 is prepared by the encryption/decryption key preparing unit 14 of the IC card 12 as described above with reference to FIG. 1, the encryption/decryption key preparing unit 14 sets both the first and second flags F1 and F2 to the set state "1".

Figure 3:
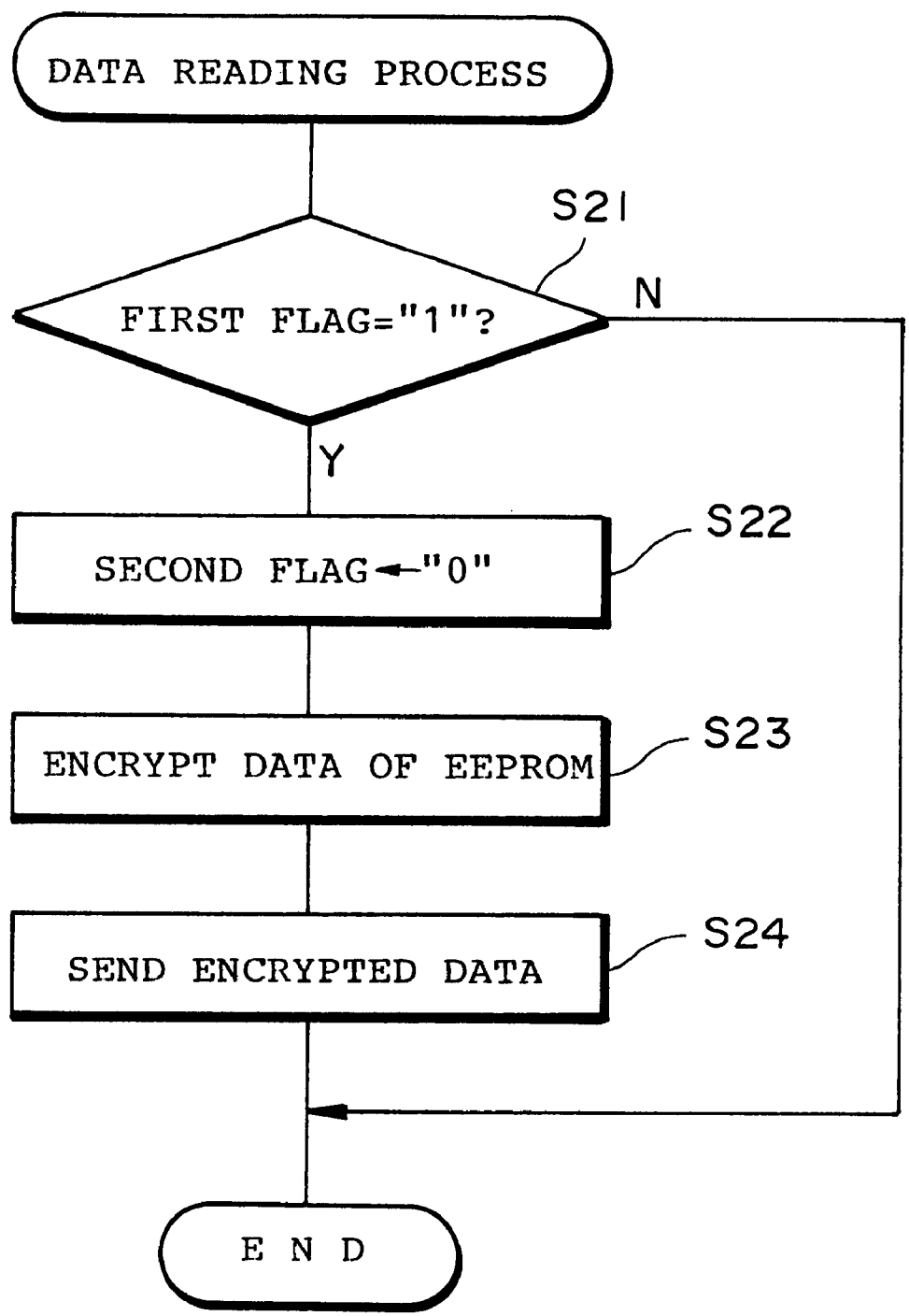
FIG. 3 is a flow chart showing a data reading process of the communication system according to the present invention shown in FIG. 2.

At this time, when the reading/writing unit 17 receives the command for the data reading process, the judgment means 17a judges whether the first flag F1 is in the set state or not (step S21) as shown in FIG. 3.

When the first flag F1 is in the reset state "0", the reading/writing unit 17 terminates the data reading process.

On the other hand, when the first flag F1 is in the set state "1", the second flag F2 is changed to the reset state "0" (step S22). In this flag state, the reading/writing unit 17 reads out plain text data from the memory unit 16 (FIG. 1). The plain text data are encrypted by the encryption/decryption processing unit 15 by using the encryption/decryption key Y1 as described above (step S23) and are then transmitted to the receiving apparatus 11 as ciphertext (step S24).

Figure 4:
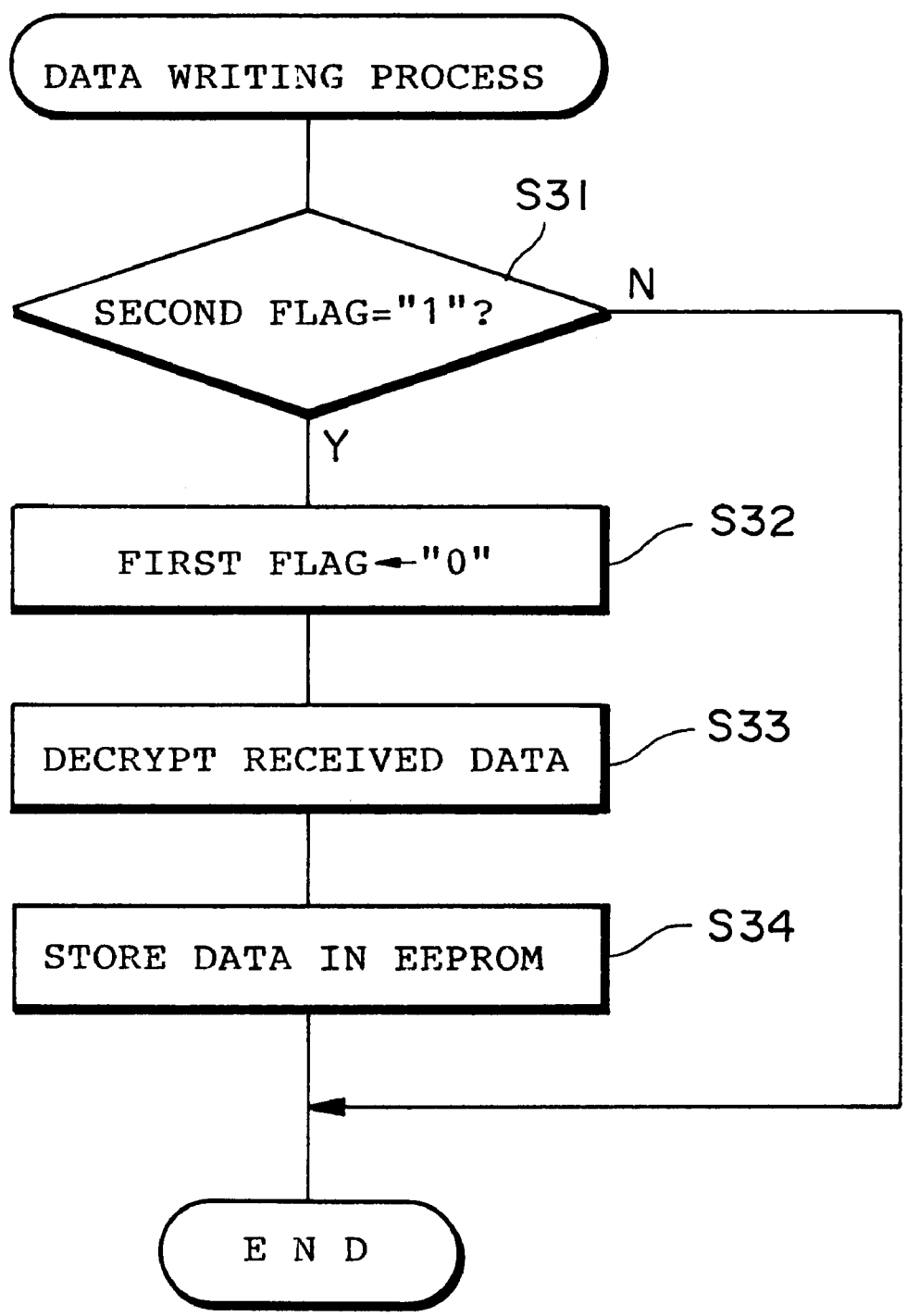
FIG. 4 is a flow chart showing a data writing process of the communication system according to the present invention shown in FIG. 2.

Further, as shown in FIG. 4, when the reading/writing unit 17 receives the command for the data writing process, the judgment means 17a judges whether the second flag F2 is in the set state or not (step S31).

When the second flag F2 is in the reset state "0", the reading/writing unit 17 terminates the data writing process.

On the other hand, when the second flag F2 is in the set state "1", the first flag F1 is changed to the reset state "0" (step S32). In this flag state, the encryption/decryption processing unit 15 of the IC card 12 decrypts the encrypted write data sent from the receiving apparatus 11 by using the encryption/decryption key Y1 (step S33). The decrypted plain text data are written in the memory unit 16 by the reading/writing unit 17 (step S34).

In the communication system 10 shown in FIG. 2, the IC card 12 uses the first and second flags, so that simultaneous or parallel processing of the data reading process and the data writing process is impossible and only one of them can be selectively performed. Accordingly, the simultaneous processing of the data reading process and the data writing process using the same encryption/decryption key Y1 is impossible.

In other words, the encryption/decryption key Y1 is varied for each of the data reading process or the data writing process. Accordingly, even if contents of plain text data are identical, encrypted communication data are varied for each communication since the encryption/decryption key Y1 is varied.

Accordingly, higher security can be ensured.

In addition, in the communication system 10 shown in FIG. 2, for example, even if a combination of one plain text and ciphertext corresponding to the plain text is clarified to thereby cryptanalyze an encryption/decryption key Y1 used at this time and altered data are written in order to alter the IC card 12, an encryption/decryption key Y1 upon writing thereof is different from the cryptanalyzed encryption/decryption key Y1.

Accordingly, it is impossible to alter data as desired and forgery of the IC card 12 by alteration of data can be prevented exactly.

In order to prevent the forgery of the IC card 12 by alteration of data, various proper measures can be adopted instead of adoption of the above flags to make it impossible to perform the simultaneous processing of the data reading process and the data writing process.

As the random number generators 13' and 13 of the receiving apparatus 11 and the IC card 12 shown in FIGS. 1 and 2, a well-known random number generator for generating random numbers via a hardware manner or a microprocessor for generating random numbers via a software manner can be adopted.

Figure 5:
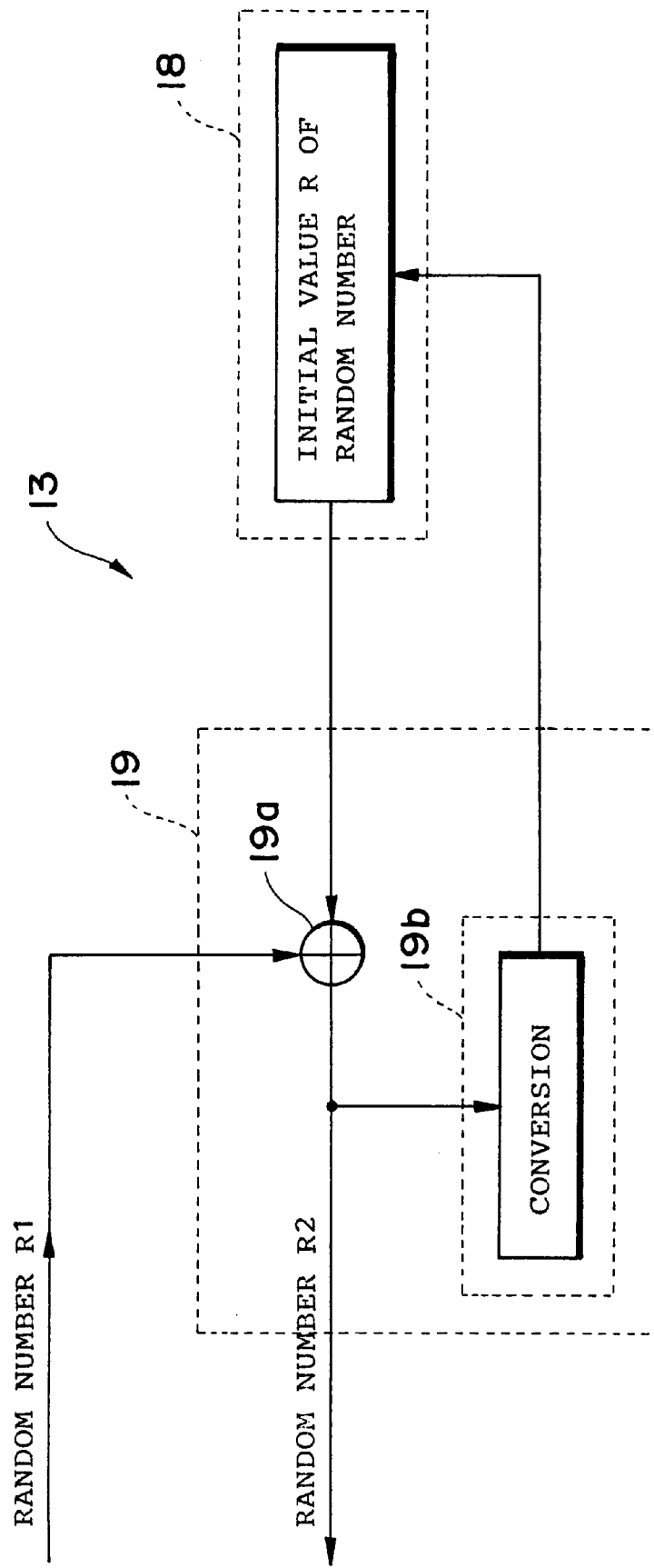
FIG. 5 is a schematic diagram illustrating another example of a random number generating unit in a terminal of the communication system according to the present invention.
Figure 6:
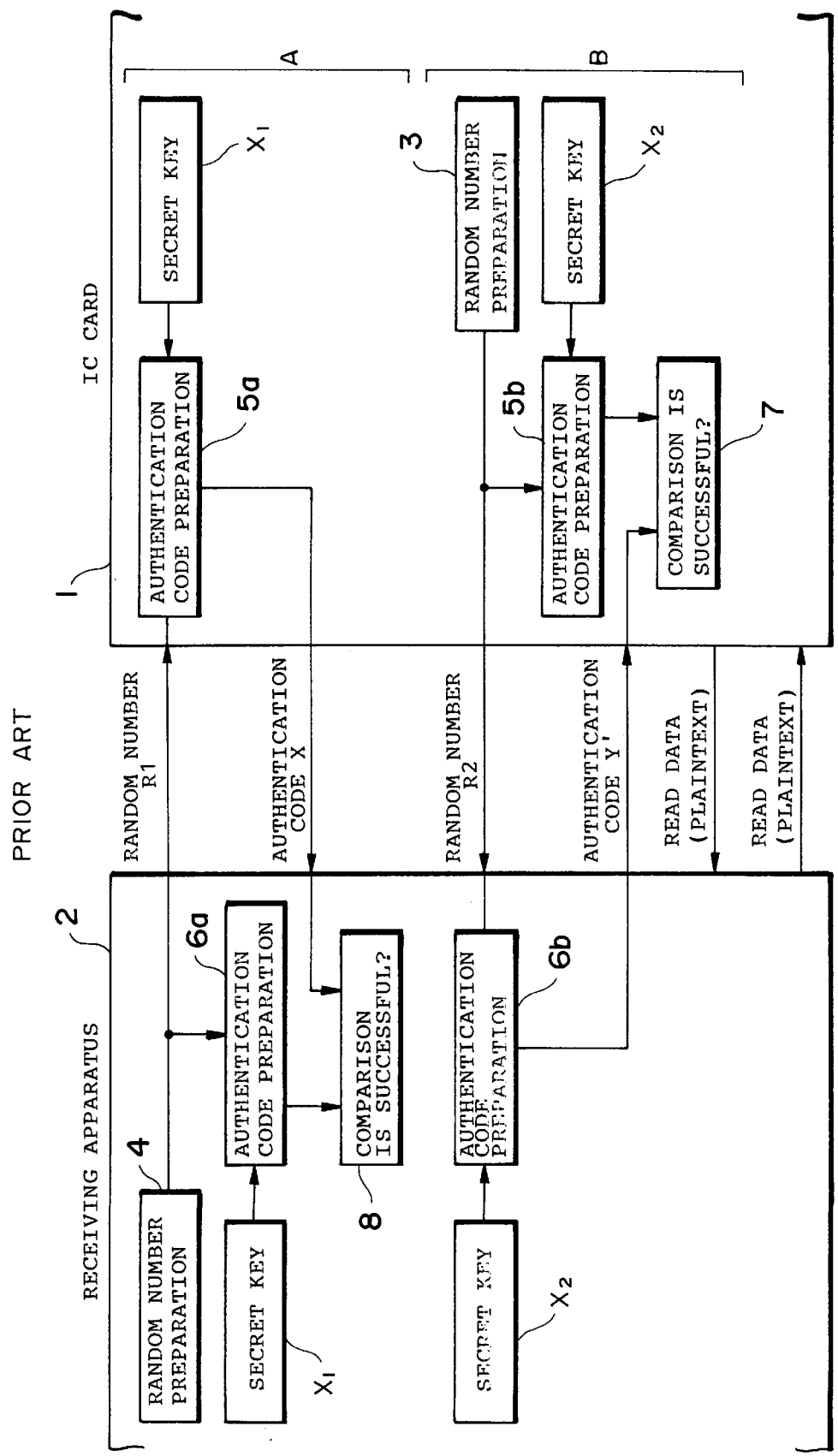
FIG. 6 is a schematic diagram illustrating a conventional communication system.

However, in order to make the IC card 12 small, the random number generator 13 of the IC card 12 is desirably configured as shown in FIG. 5.

The random number generator 13 of the IC card 12 includes, as shown in FIG. 5, a random number storage portion 18 constituted by a rewritable memory, for example, and an arithmetic operation portion 19.

The arithmetic operation portion 19 includes, in an example shown in FIG. 5, an arithmetic circuit 19a constituted by an XOR (exclusive-OR) circuit and a random number conversion circuit 19b for converting a random number.

An initial value R of a random number having 8 bits, for example, is stored in the random number storage portion 18 and the arithmetic circuit 19a generates a random number R2 by an arithmetic operation (XOR) of the random number R1 of, for example, 8 bits received from the receiving apparatus 11 and the initial value R from the random number storage portion 18.

Further, the random number R2 generated by the random number conversion circuit 19b is sent to the encryption/decryption key preparing unit 14' of the receiving apparatus 11 and the encryption/decryption key preparing unit 14 of the IC card 12 in order to prepare the encryption/decryption key Y1 in the same manner as in the above example.

Further, the random number R2 prepared by the random number conversion circuit 19b is sent to the random number storage portion 18 in order to rewrite the initial value of the random number after converted by the random number conversion circuit 19b. Consequently, the initial value R of the random number is successively updated each time data is read or written subsequently.

Accordingly, security of communication between the receiving apparatus 11 and the IC card 12 can be further improved.

The conversion process by the random number conversion circuit 19b can adopt a bit inversion process such that "1" or "0" of a specific bit of the random number R2 is inverted, a bit replacement process that a position of a specific bit is replaced with another position, or another conversion process properly.

In the example shown in FIG. 5, the random number R1 generated by the receiving apparatus 11 can be utilized to generate the random number R2 in the IC card 12. Accordingly, the random number R2 can be prepared properly without provision of a microprocessor for executing a random number generating program in the IC card 12 and without provision of a random number generator having a complicated configuration as the random number generator 13 in the IC card 12.

Accordingly, the security of communication can be further enhanced and configuration of the IC card can be simplified.

In the foregoing description, the IC card is described as an example of the terminal, while various terminals such as a module, a package, or the like including integrated circuits can be used regardless of a form thereof.

Further, as the memory unit of data used in various application programs and the random number storage portion, electrically rewritable non-volatile memory means such as a static random access memory (SRAM) with a backup power supply can be properly used in addition to the EEPROM.

Furthermore, the present invention is not limited to a specific encryption system or an interface system between the communication apparatus and the terminal and can be applied to any encryption system or a contact or non-contact type interface system.

What is claimed is:

1. A communication system comprising a communication apparatus and a terminal for allowing a secure communication of data therebetween, wherein said communication apparatus and said terminal each hold a common secret key, and wherein:

said communication apparatus comprises:
  a first random number generating unit for generating a first random number;
  an encryption/decryption key preparing unit for preparing an encryption/decryption key on the basis of the first random number generated by said first random number generating unit of said communication apparatus, a second random number generated by a second random number generating unit of said terminal, and the common secret key; and
  an encryption/decryption processing unit for encrypting or decrypting the data communicated between said communication apparatus and said terminal by using the encryption/decryption key; and
said terminal comprises:
  said second random number generating unit for generating the second random number;
  an encryption/decryption key preparing unit for preparing the encryption/decryption key on the basis of the first random number generated by said first random number generating unit of said communication apparatus, the second random number generated by said second random number generating unit of said terminal, and the common secret key; and
  an encryption/decryption processing unit for encrypting or decrypting the data communicated between said communication apparatus and said terminal by using the encryption/decryption key.

2. A communication system as claimed in claim 1, wherein said terminal further comprises a memory unit in which data for specifying a function of said communication apparatus is stored.

3. A communication system as claimed in claim 2, wherein the data for specifying the function of said communication apparatus comprises data for specifying a receivable program of said communication apparatus.

4. A communication system as claimed in claim 2, wherein the data for specifying the function of said communication apparatus comprises data of a term for a receivable program specified by said communication apparatus.

5. A communication system as claimed in claim 2, wherein:
  said terminal further comprises a reading/writing unit for reading data from said memory unit and writing data into said memory unit;
  said reading/writing unit comprises a judgement means for controlling reading of data from and writing of data into said memory unit;
  said encryption/decryption key preparing unit of said terminal comprises signal producing means for producing a signal for permitting reading and writing of data by said reading/writing unit to supply said signal to said judgment means.

6. A communication system as claimed in claim 5, wherein said second random number generating unit of said terminal comprises an arithmetic operation portion for generating the second random number by using the first random number generated by said first random number generating unit of said communication apparatus and a random number storage portion for storing random numbers rewritably.

7. A communication system as claimed in claim 5, wherein said signal producing means produces a first signal for permitting reading of data by said reading/writing unit to supply the first signal to said judgment means and produces a second signal for permitting writing of data by said reading/writing unit to supply the second signal to said judgement means.

8. A communication system as claimed in claim 7, wherein:
  said signal producing means produces first and second flags to supply the flags to said judgement means; and
  said reading/writing unit is permitted to read data from said memory unit when the first flag is in a set state and to write data into said memory unit when the second flag is in a set state.

9. A communication system as claimed in claim 1, wherein said second random number generating unit of said terminal comprises an arithmetic operation portion for generating the second random number by using the first random number generated by said first random number generating unit of said communication apparatus and a random number storage portion for storing random numbers rewritably.

10. A communication system as claimed in claim 9, wherein said terminal is an IC card.

11. A communication system as claimed in claim 9, wherein said arithmetic operation portion comprises an arithmetic operation circuit for generating the second random number by means of an arithmetic operation of a random number stored in said random number storage unit and the first random number.

12. A communication system as claimed in claim 11, wherein said arithmetic operation portion comprises a conversion processing circuit for converting the second random number, and wherein the random number in said random number storage portion is updated so that the random number is equal to a converted value obtained from said conversion processing circuit.

13. A communication system as claimed in claim 12, wherein the conversion process by said conversion processing circuit is a bit replacement process.

14. A communication system as claimed in claim 12, wherein the conversion process by said conversion processing circuit is a bit inversion process.

15. A communication method for allowing a secure communication of data between a communication apparatus and a terminal, wherein the communication apparatus and the terminal each hold a common secret key, said method comprising:
  generating a first random number in the communication apparatus;
  generating a second random number in the terminal;
  preparing, in the communication apparatus, an encryption/decryption key on the basis of the first random number generated in the communication apparatus, the second random number generated in the terminal, and the common secret key; and
  preparing, in the terminal, the encryption/decryption key on the basis of the first random number generated in communication apparatus, the second random number generated in the terminal, and the common secret key;
  encrypting or decrypting, in each of the communication apparatus and the terminal, the data communicated between the communication apparatus and the terminal by using the encryption/decryption key.

16. A communication method for allowing a secure data communication between a communication apparatus and a terminal, wherein the terminal is provided with a memory unit in which function data specifying a function of the communication apparatus is stored, said method comprising:
  storing a common secret key in each of the communication apparatus and the terminal;
  generating first and second random numbers in the communication apparatus and the terminal, respectively;

encrypting the function data by using the first and second random numbers generated by the communication apparatus and the terminal, respectively, and the common secret key;

restricting the function of the communication apparatus based on a communication of the encrypted function data.

17. A communication method as claimed in claim 16, wherein the communication apparatus and the terminal each comprise a random number generating unit, an encryption/decryption key preparing unit for preparing an encryption/decryption key on the basis of the first and second numbers generated by the random number generating units of the communication apparatus and terminal, respectively, and the secret key, and an encryption/decryption processing unit for encrypting or decrypting data communicated between the communication apparatus and the terminal including the function data by using the encryption/decryption key, wherein:

when the terminal receives a command from the communication apparatus for reading out data from the memory unit, the terminal encrypts the read out data from the memory unit by means of the encryption/decryption key to transmit the encrypted data to the communication apparatus; and the terminal is responsive to a command from the communication apparatus for writing data into the memory unit to decrypt ciphertext corresponding to the data by means of the encryption/decryption key and to write the decrypted data into the memory unit when the terminal receives the command from the communication apparatus.

18. A communication method as claimed in claim 17, wherein the reading of data from the terminal and the writing of data to the terminal cannot be performed at the same time.

* * * * *